D. SAWYER.

Improvement in Devices for Fastening Nuts.

No. 131,630.                            Patented Sep. 24, 1872.

Witnesses:                                    Inventor:

P. C. Dieterich                               D. Sawyer

C. Sedgwick                              PER   Munn & Co

Attorneys.

UNITED STATES PATENT OFFICE.

DANIEL SAWYER, OF TOPEKA, KANSAS.

IMPROVEMENT IN DEVICES FOR FASTENING NUTS.

Specification forming part of Letters Patent No. 131,630, dated September 24, 1872.

*To all whom it may concern:*

Be it known that I, DANIEL SAWYER, of Topeka, in the county of Shawnee and State of Kansas, have invented a new and Improved Bolt and Nut Lock, of which the following is a specification:

My invention consists of a flange on the nut with a series of holes and a spring-pawl, with a pin in the free end to enter said holes of the flange and lock the nut against turning, the pawl being pivoted to another washer fastened to the timber, or to the timber and to a metal plate thereon, all as hereinafter described.

Figure 1:
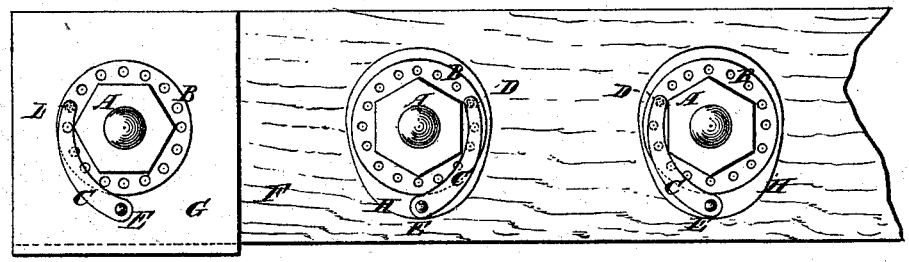
Figure 2:
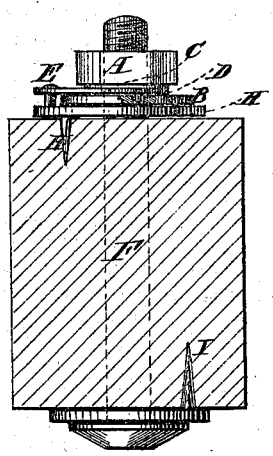
Figure 3:
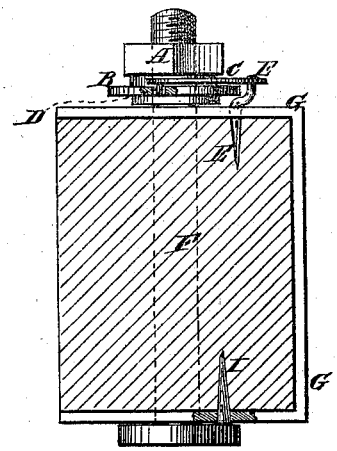

Figure 1 represents three examples of my improved nut-fastening in plan view, and Figs. 2 and 3 are side elevations in two different modifications.

A is the nut and B the perforated flange thereof. C is the spring-pawl with a pin, D, in one end for engaging the perforated flange to hold the nut from turning, the other end of the pawl being pivoted at E to the timber F, or to the same and a plate of metal, G, or to a washer, H, fastened to the timber F by spurs, or in any other way. The flange B is on the bottom side of the nut, and the holes through it are parallel with the bolt. The spring-pawl lies upon the top of the flange of the nut of a vertical bolt, and the front side of the flange of a nut of a horizontal bolt, and is caused to press by its tension thereon so as to keep its pin D in the hole of the flange. It will be seen that, however loose the nut may be by the expansion of the bolt, it will be effectually prevented from turning. The bolt may be prevented from turning so as to screw out of the nut when made round by a stud-pin, I; but this will not be needed if the bolt have plane sides and the hole corresponds.

Having thus described my invention, I claim as new, and desire to secure by Letters Patent—

A bolt and nut fastening, consisting of a perforated flange, B, and spring-pawl C with a pin, D, combined with the bolt and nut, as described, the said spring-pawl being fastened to a washer, H, the timber F, or a plate, G, substantially as specified.

DANIEL SAWYER.

Witnesses:
W. S. NICHOLS,
WM. H. SESSIONS.